F. H. WAGNER.
APPARATUS FOR EXTRACTING TAR FROM GAS.
APPLICATION FILED MAR. 28, 1912.
1,067,774.
Patented July 15, 1913.
3 SHEETS—SHEET 3.
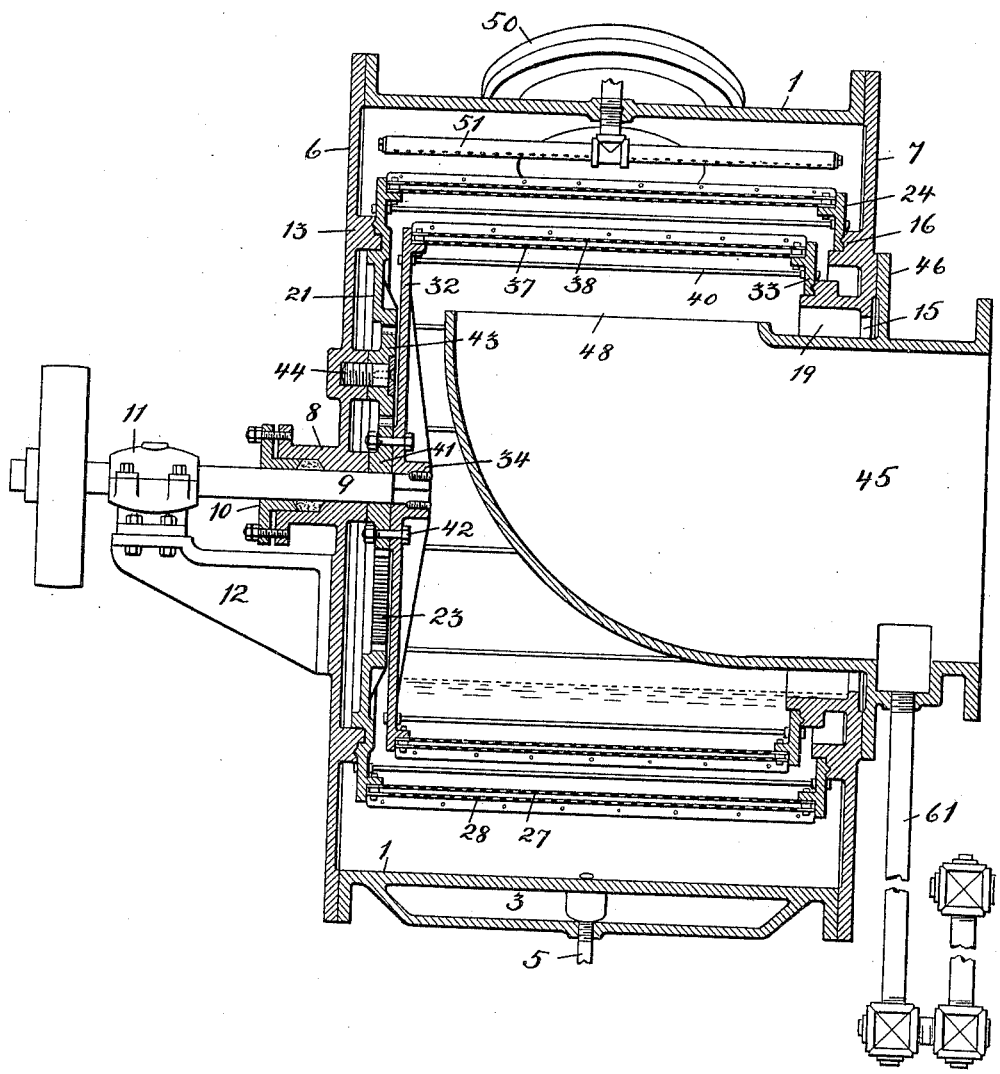

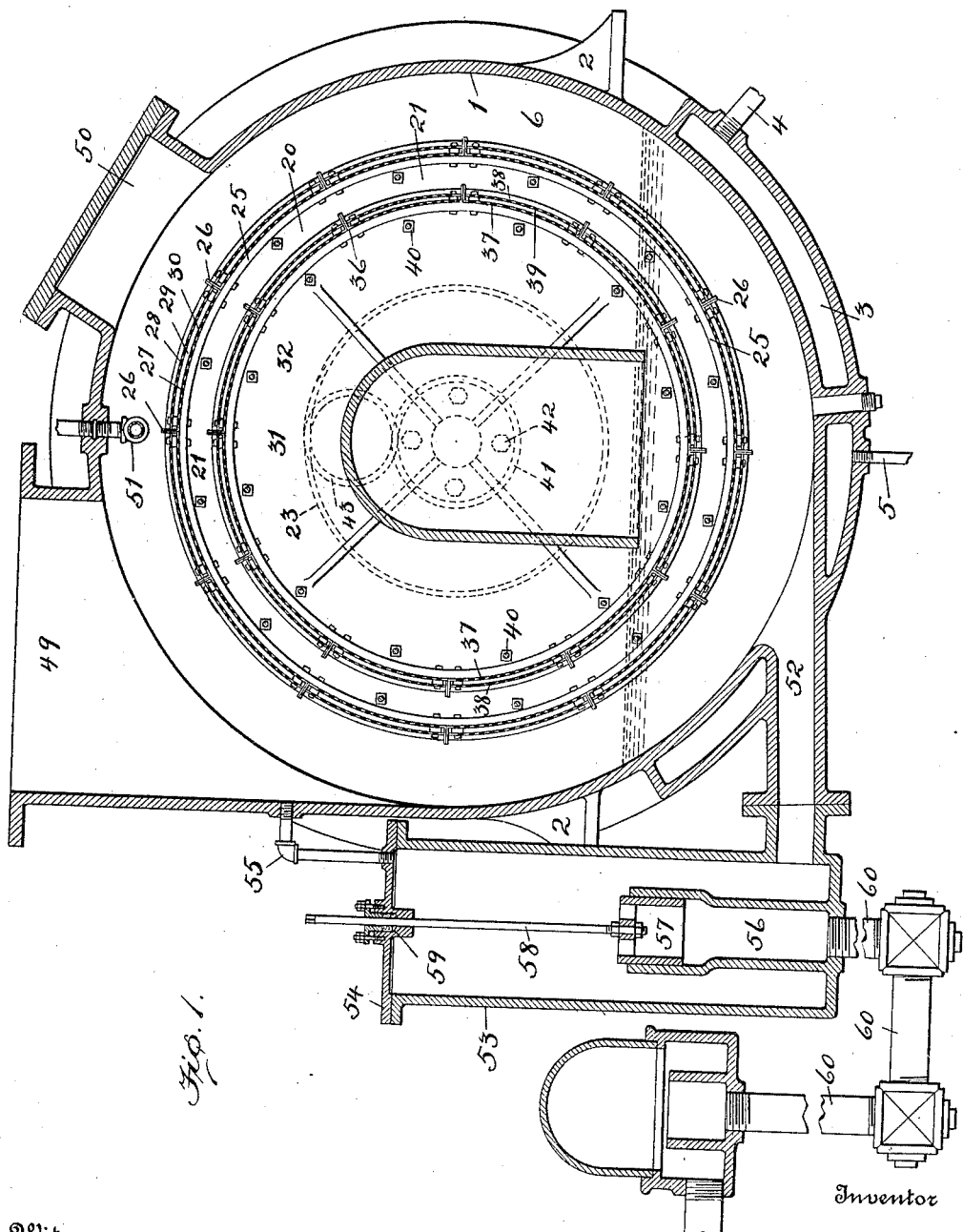

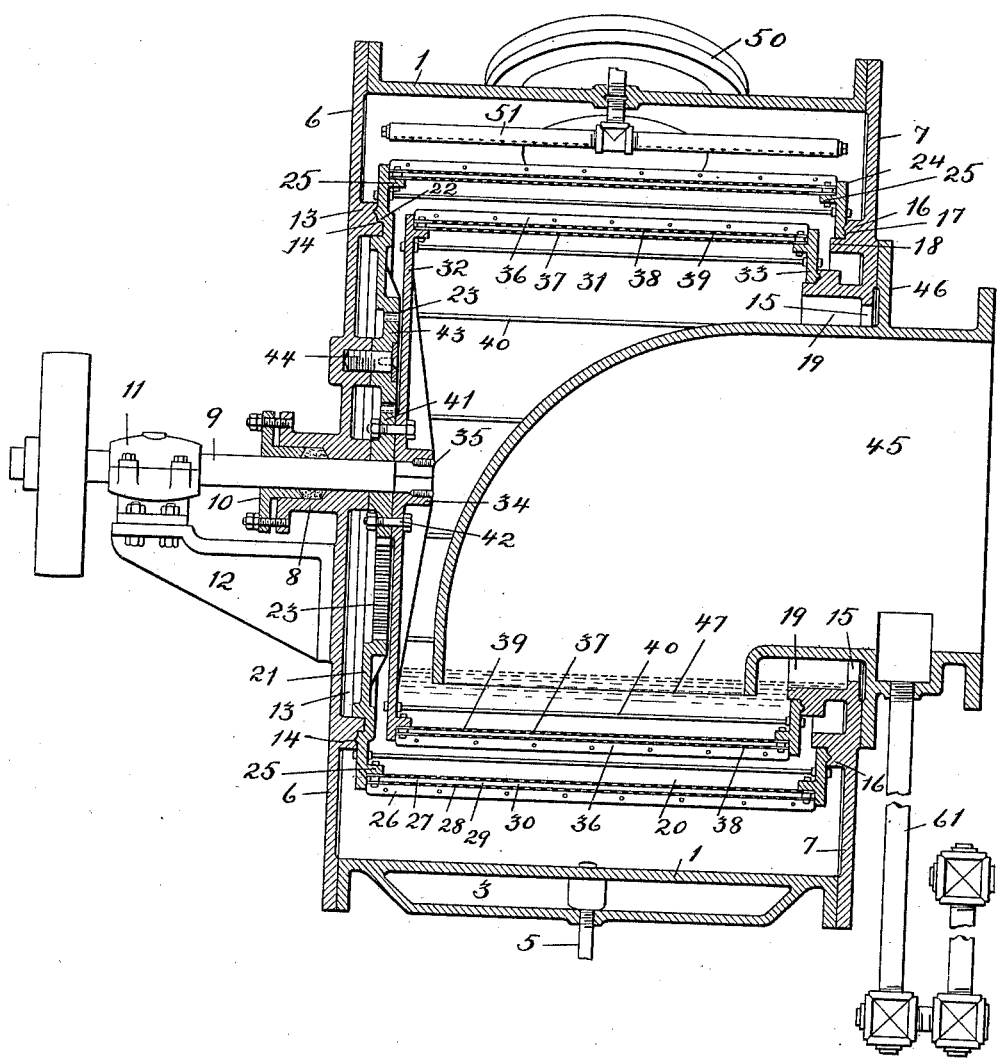

UNITED STATES PATENT OFFICE.

FREDERICK H. WAGNER, OF BALTIMORE, MARYLAND, ASSIGNOR TO THE BARTLETT HAYWARD COMPANY, OF BALTIMORE, MARYLAND, A CORPORATION OF MARYLAND.

APPARATUS FOR EXTRACTING TAR FROM GAS.

1,067,774.   Specification of Letters Patent.   Patented July 15, 1913.

Application filed March 28, 1912. Serial No. 686,883.

*To all whom it may concern:*

Be it known that I, FREDERICK H. WAGNER, citizen of the United States, residing at Baltimore, in the State of Maryland, have invented certain new and useful Improvements in Apparatus for Extracting Tar from Gas, of which the following is a specification.

This invention relates to an apparatus for the extraction of tar from gas, such for example as illuminating gas.

The desirability of freeing gas of tarry matters is so well known to those skilled in the art of manufacturing heating and illuminating gas, as to need no explanation here, and the object of the present invention is to provide an improved apparatus effecting the separation in a practical and economical manner.

Practical illustrations of apparatus for carrying out the invention are disclosed in the accompanying drawings wherein, Figure 1, shows a vertical cross-sectional elevation through the improved apparatus; Fig. 2, a similar view but taken on a line at right angles to that shown in Fig. 1, and Fig. 3, is a view similar to that shown in Fig. 2, but showing a slightly modified arrangement of gas inlet nozzle.

Referring to the drawings by numerals, 1, designates a casing of substantially a circular form and provided at opposite sides with suitable brackets, 2, by which the same may be sustained. At the lower portion the casing is provided with a circumferential chamber, 3, forming a steam space with which a steam pipe, 4, and a drain pipe, 5, are connected as shown in Fig. 1, of the drawing. The casing has a vertical side plate, 6, at one side and a vertical side plate, 7, at the opposite side. The side plate 6, has a central hub or boss, 8, through which a horizontal shaft 9, extends and a gland, 10, and packing serves to make a gas-tight joint about the shaft. The outer end of the shaft, 9, is supported in a bearing, 11,— the latter being sustained on a suitable bracket, 12, that is carried at the side of the plate, 6.

The inner vertical surface of the side plate, 6, is provided with a circular flange, 13, having an irregular or angular vertical face, 14, for a purpose presently to be explained. The plate, 7, at the opposite side of the apparatus has a central circular opening, 15, and like plate, 6, is also provided at its inner surface with a horizontally-projecting circular flange, 16, which has an irregular or angular face, 17, and a sustaining flange, 18. The flange, 13, on the plate, 6, and the flange 16, on plate, 7, are of like diameters and are in alinement because they are to coact as will presently appear. The plate, 7, has a circular ring flange, 19, which projects laterally from the inner surface and has position between the circular opening, 15, and the flange, 16.

A circular drum, 20, is provided on the interior of the casing, 1, and said drum has a ring plate, 21, at one side which ring plate is provided with an annular recess, 22, which conforms to, engages and closely fits, the flange, 13, on the plate, 6, of the outer casing so as to form a substantially tight joint between the plate, 6, and ring-plate, 21. The ring-plate, 21, has a central opening the wall of which carries a circular rack, 23, by means of which rotary motion may be imparted to the drum, as will presently be described. The opposite side of the drum, 20, has a ring-plate, 24, of less width that the ring-plate, 21, at the other side, and said ring-plate, 24, engages the sustaining flange, 18, on the circular flange, 16. It will thus be understood that the drum, 20, is rotatably sustained between the two flanges, 13, and, 16, on the side plates, 6, and, 7. Each ring plate, 21, and, 24, has a circular flange, 25, at its inner side and a series of spaced-apart T-bars, 26, extend horizontally between and are supported against the flanges, 25, as best seen in Fig. 1. The drum, 20, also has circumferential covering which is sustained by the flanges, 25, and in practice this covering is formed by a series of inner curved plates, 27, and a series of outer curved plates, 28, said inner and outer plates being separated by suitable spacing rings, 29, so as to provide segmental spaces, 30, between the plates and also between adjacent T-bars, 26. The plates, 27, and, 28, are provided with perforations,— the perforations in the two sets of plates being so disposed with respect to each other as to practically be out of direct line. It will be noted that the T-bar flanges extend radially from and project outwardly beyond the outer plates, 28, thereby serving as flights or lifts to effect a desirable result in the operation, as will hereinafter be explained. Suitable tie rods extend horizontally between the ring-plates, 21, and, 24, and thus hold the drum parts rigidly together. A second drum or shell, 31, has side ring-plates, 32, and, 33, respectively,—the former being of a greater width than the latter and having a central hub, 34, which receives the inner end of shaft 9, by means of which latter it is sustained. Suitable keys or bolts, 35, rigidly secure the ring-plate, 32, of this inner shell to the shaft, as seen in Fig. 2, of the drawings. The narrower ring-plate, 33, of the inner shell seats around the ring-flange, 19, in plate, 7, of the outer casing and is thus rotatably sustained in the drum, 20. This inner shell is also provided with horizontally-extending T-bars, 36, and inner and outer curved plates, 37, and, 38, respectively with segmental spaces, 39, between them. Tie-rods, 40, serve to rigidly hold the ring-plates, 32, and, 33, together. In order to provide for rotating the inner shell, 31, I provide a planetary gear mechanism, shown in broken lines in Fig. 1, and sectional elevation in Figs. 2 and 3.

A gear, 41, is rigidly secured by bolts, 42, to the outer side of ring-plate, 32, and about the shaft, 9, but no connection is made in the present instance, between the said gear and the shaft. An intermediate pinion, 43, is mounted on a pin, 44, that is rigidly secured to the inner side of the side plate, 6, of the outer casing and one side of said pinion meshes with the gear, 41, while the diametrically-opposite side of said pinion meshes with the circular rack, 23, in the central opening of ring-plate, 21, on drum, 20.

It is believed to be clear from the foregoing explanation, that when shaft, 9, is turned the inner shell, 31, will turn in the same direction as the shaft and will rotate with it the gear, 41. This gear, 41, will then revolve pinion, 43, and the latter, by meshing with rack, 23, on the drum, 20, will cause the latter to revolve in a direction reverse to that in which the inner shell is traveling. A gas-inlet nozzle, 45, projects through the opening, 15, in the side plate, 7, of the outer casing and enters the inner shell,—a lateral flange, 46, extending from the nozzle is closely seated by any suitable means against the outer surface of said side plate, 7. The only difference between the structures shown in Figs. 2 and 3 of the drawings is the position of the outlet-end of the gas nozzle, 45, although there is an advantage in having the outlet, 47, turned downwardly, as in Fig. 2, instead of an up-turned outlet, 48, as in Fig. 3, as will presently be explained. A take-off nozzle, 49, is provided at the upper side of casing, 1, and a man-hole, 50, is provided to give access to the interior of the apparatus. A perforated pipe, 51, enters the upper side of the casing and extends across the outer drum, 20, by means of which a liquor may if desired, be deposited onto the drum.

In the extraction of tar from gas it is well known that heated tar is a good extracting medium. I therefore make use of tar heated sufficiently to cause it to flow and by maintaining a liquid-tar level in the lower portion of the outer casing and of sufficient depth to cause the lower circumferential portion of the drum, 20, and shell, 31, to pass through the tar,—the plates, 27, and, 28, of the drum and plates, 37, and, 38, of the inner shell both passing through the liquid tar and picking up sufficient tar to provide a coating for the plates so that the gas in seeking an outlet will be compelled to pass the tar coating and thereby be brought into intimate contact with the tar. The casing, 1, has a passage, 52, at its bottom which enters the lower end of an overflow cylinder, 53. This cylinder is provided with a cover, 54, which effectually seals it and a pipe, 55, establishes communication between said cylinder and the outlet nozzle, 49, of the casing whereby to permit the escape of gas that might otherwise accumulate in the cylinder. An adjustable overflow is provided in the cylinder, 53, and consists of a stand-pipe, 56, having a vertically-movable sleeve, 57, in its upper end with a stem, 58, extending from the sleeve through a stuffing box, 59, in the cover. An overflow pipe, 60, enters the lower end of stand-pipe, 56, and has a substantially U-shape or return bend and forms a trap to prevent the escape of gas. By referring to Figs. 2 and 3 it will be noted that the gas-inlet nozzles, 45, are provided with seals, 61, for the outlet of tar that might otherwise accumulate in the inlet nozzles.

In operation the inner shell, 31, and encircling drum, 20, are revolved in opposite directions so the T-bars and curved perforated plates on the circumference thereof will pick up the liquid tar in the bottom of casing, 1, thus continuously coating said plates with tar. The gas will be admitted to the inner shell through inlet nozzles, 45, and in the device shown in Fig. 2, the downturned outlet, 47, of the nozzle is slightly submerged in the tar which requires the gas to bubble through the hot tar before entering the shell. In Fig. 3, the gas is admitted directly into the shell without first passing through the tar. In seeking an outlet from the inner shell the gas passes through the perforations in the inner plates, 37, and through the tar coating thereon; then across the segmental spaces, 39, and through the tar covered perforations in the outer plates, 38, and into the encircling drum, 20. It will thus be seen that the passage of the gas as just described brings it into intimate contact with the film of tar on the two sets of plates, 37, and, 38, which picks up the tarry matters, because of the affinity of tar with tar. The encircling drum, 20, being revolved in a direction reverse to that in which the shell revolves, causes a disturbance of the gas and an intermixing of the gas and tar that drips from the plates, 27, and, 28, through which the gas must pass before it can find an outlet in the outer casing and then to the nozzle, 49. The steam chamber, 3, serves to keep the casing hot at the point where the tar is retained and thus heats the tar.

What I claim is,—

1. In an apparatus for treating gas, the combination with a casing having a gas outlet, of an inner receptacle in said casing with gas outlets in its wall; an outer receptacle also in the casing and around but spaced from the said inner receptacle,—said outer receptacle also having gas outlets in its wall; means for conducting gas to the interior of the inner receptacle; means for moving the outer receptacle about the inner receptacle and means for coating the outer receptacle with a fluid while it is in motion.

2. In an apparatus for treating gas, the combination with a casing having a gas outlet, of an inner receptacle in said casing and having gas outlets in its wall; an outer receptacle also in the casing and around but spaced from the inner receptacle,—said outer receptacle also having gas outlets; means for conducting gas to the interior of the inner receptacle; means for applying a gas-treating fluid to the two receptacles and means for revolving the said inner and outer receptacles in opposite directions.

3. In an apparatus for treating gas, the combination with a casing having a gas outlet, of a circular inner receptacle in said casing and having gas outlets in its circular wall; a circular outer receptacle also in the casing and around the said inner receptacle,—said outer receptacle also having gas outlets in its circular wall; means for conducting gas to the interior of the inner circular receptacle; means for applying a gas treating fluid to the circular walls of said inner and outer receptacle and means for revolving the inner receptacle in one direction and revolving the outer receptacle in a reverse direction.

4. In an apparatus for treating gas the combination with a casing having a gas outlet and a fluid-retaining chamber, of a circular receptacle in said casing and having gas outlets on its circular wall; a gas inlet nozzle extending through the casing and into the receptacle and having its open end submerged in the fluid in the fluid-retaining chamber so as to conduct gas to the interior of the receptacle and liberate it in the fluid, and means for revolving said receptacle to pass the outlets in its circular wall through the fluid in said fluid-retaining chamber.

5. In an apparatus for treating gas, the combination with a casing having a gas outlet, of an inner circular receptacle in said casing and having gas outlets in its circular wall; an outer circular receptacle also in the casing and around but spaced from the said inner receptacle,—said outer receptacle also having gas outlets in its circular wall; means for conducting gas to the interior of the inner receptacle; means for revolving the inner receptacle in one direction; means operated by the inner circular receptacle and co-acting with the outer circular receptacle to revolve the latter in a reverse direction and means for applying a gas-treating fluid to the gas-outlets of said inner and outer circular receptacles.

6. In an apparatus for treating gas, the combination with a casing having a gas outlet, of a shaft at one side of said casing; a gas-inlet nozzle entering the casing at the side opposite to the said shaft; a circular receptacle having an opening at one side to encircle the said inlet nozzle and at the other side said receptacle being connected to said shaft,—said receptacle having openings in its circumferential wall; a second receptacle encircling the first-named receptacle and rotatably sustained between the walls of the casing and means for revolving both receptacles in the casing around the gas-inlet nozzle.

7. In an apparatus for treating gas the combination with a casing having a circular opening at one side and at its opposite inner sides having circular bearing flanges, of an outer perforated receptacle engaging the circular flanges on the casing and rotatably sustained thereby; an inner perforated receptacle in said outer receptacle and said inner receptacle being rotatably sustained by the casing wall at one side; a shaft entering the casing and sustaining the inner receptacle at the other side; a gas-inlet nozzle extending through the circular opening at the one side of the casing and entering the inner receptacle,—said nozzle having a laterally-turned end to direct the gas toward the perforated wall of the inner receptacle, and means for revolving the two receptacles in the casing and about the nozzle.

8. In an apparatus for treating gas the combination with a casing, of a plurality of concentric receptacles in said casing said receptacles having perforated circumferential walls; a gas inlet nozzle entering the casing and projecting into the inner receptacle, means for applying a fluid to the walls of the concentric receptacles and gear mechanism operatively connecting the concentric receptacles to cause one receptacle to revolve in a direction reverse to the direction of revolution of another of said receptacles.

In testimony whereof I affix my signature in presence of two witnesses.

FREDERICK H. WAGNER.

Witnesses:
  JOHN W. HEWES,
  G. FERD. VOGT.

Copies of this patent may be obtained for five cents each, by addressing the "Commissioner of Patents, Washington, D. C."